(12) United States Patent
Kuthuru et al.

(10) Patent No.: US 11,937,076 B2
(45) Date of Patent: Mar. 19, 2024

(54) ACOUSTIC ECHO CANCELLATION

(71) Applicant: Hewlett-Packard Development Company, L.P., Spring, TX (US)

(72) Inventors: Srikanth Kuthuru, Palo Alto, CA (US); Sunil Bharitkar, Palo Alto, CA (US); Madhu Sudan Athreya, Palo Alto, CA (US)

(73) Assignee: Hewlett-Packard Development Copmany, L.P., Spring, TX (US)

( * ) Notice: Subject to any disclaimer, the term of this patent is extended or adjusted under 35 U.S.C. 154(b) by 67 days.

(21) Appl. No.: 17/419,460

(22) PCT Filed: Jul. 3, 2019

(86) PCT No.: PCT/US2019/040535
§ 371 (c)(1),
(2) Date: Jun. 29, 2021

(87) PCT Pub. No.: WO2021/002862
PCT Pub. Date: Jan. 7, 2021

(65) Prior Publication Data
US 2022/0116733 A1  Apr. 14, 2022

(51) Int. Cl.
*H04S 7/00* (2006.01)
*G10L 21/0216* (2013.01)
*H04R 3/04* (2006.01)
*H04R 5/04* (2006.01)
*G10L 21/0208* (2013.01)

(52) U.S. Cl.
CPC .......... *H04S 7/307* (2013.01); *G10L 21/0216* (2013.01); *H04R 3/04* (2013.01); *H04R 5/04* (2013.01); *H04S 7/303* (2013.01); *G10L 2021/02082* (2013.01); *G10L 2021/02166* (2013.01)

(58) Field of Classification Search
None
See application file for complete search history.

(56) References Cited

U.S. PATENT DOCUMENTS

| | | |
|---|---|---|
| 5,737,485 A | 4/1998 | Flanagan et al. |
| 6,266,408 B1 | 7/2001 | Park |
| 8,229,134 B2 | 7/2012 | Duraiswami et al. |
| 8,751,029 B2 | 6/2014 | Soulodre |
| 9,293,151 B2 | 3/2016 | Herbig et al. |
| 9,426,300 B2 | 8/2016 | Kim et al. |
| 9,432,625 B2 | 8/2016 | Delegue et al. |

(Continued)

FOREIGN PATENT DOCUMENTS

| | | |
|---|---|---|
| CN | 105794226 A | 7/2016 |
| CN | 105976827 A | 9/2016 |

(Continued)

*Primary Examiner* — James K Mooney
(74) *Attorney, Agent, or Firm* — Quarles & Brady LLP (57) ABSTRACT

Acoustic echo cancellation for a video conference system is described. A location of a person in a room can be determined. An audio signal received from the location of the person can be captured using beamforming. An acoustic echo cancellation parameter can be determined based in part on the audio signal captured from the location of the person. Acoustic echo cancellation can be performed on the audio signal using the acoustic echo cancellation parameter.

11 Claims, 6 Drawing Sheets

(56) References Cited

U.S. PATENT DOCUMENTS

| | | | |
|---|---|---|---|
| 9,449,613 B2 | 9/2016 | Peters et al. | |
| 9,462,387 B2 | 10/2016 | Oomen et al. | |
| 9,565,497 B2 | 2/2017 | Aggarwal et al. | |
| 9,595,997 B1 | 3/2017 | Yang | |
| 9,659,576 B1 | 5/2017 | Kotvis et al. | |
| 9,928,847 B1 | 3/2018 | Cleve et al. | |
| 10,229,698 B1 * | 3/2019 | Chhetri | H04R 3/005 |
| 2009/0323924 A1 | 12/2009 | Tashev et al. | |
| 2010/0272274 A1 | 10/2010 | Fozunbal et al. | |
| 2011/0063405 A1 | 3/2011 | Yam | |
| 2011/0222372 A1 | 9/2011 | O'Donovan et al. | |
| 2013/0034241 A1 | 2/2013 | Pandey et al. | |
| 2013/0121498 A1 | 5/2013 | Giesbrecht | |
| 2015/0012268 A1 | 1/2015 | Nakadai et al. | |
| 2015/0163593 A1 | 6/2015 | Florencio et al. | |
| 2016/0203828 A1 | 7/2016 | Gomez et al. | |
| 2017/0134849 A1 | 5/2017 | Pandey et al. | |
| 2018/0190308 A1 | 7/2018 | Lou et al. | |
| 2018/0270451 A1 | 9/2018 | Dickins et al. | |
| 2019/0028829 A1 | 1/2019 | R'Raghavendra et al. | |
| 2019/0058944 A1 | 2/2019 | Gunawan et al. | |
| 2019/0088269 A1 | 3/2019 | Markovich Golan et al. | |

FOREIGN PATENT DOCUMENTS

| | | |
|---|---|---|
| JP | 2007-228070 A | 9/2007 |
| WO | 2018/091777 A1 | 5/2018 |

\* cited by examiner

ACOUSTIC ECHO CANCELLATION

BACKGROUND

Video conferencing systems can be used for communication between parties in different locations. A video conferencing system at a near-end can capture audio-video information at the near-end and transmit the audio-video information to a far-end. Similarly, a video conferencing system at the far-end can capture audio-visual information at the far-end and transmit the audio-visual information to the near-end.

DETAILED DESCRIPTION

The present disclosure describes a machine readable storage medium as well as a method and a system for acoustic echo cancellation, such as in a video conference system. An example of the present disclosure can include a machine readable storage medium comprising instructions that, when executed by a processor, cause the processor to determine a location of a person in a room. The instructions, when executed by the processor, can cause the processor to capture an audio signal received from the location of the person using beamforming. The instructions, when executed by the processor, can cause the processor to determine an acoustic echo cancellation parameter based in part on the audio signal captured from the location of the person. The instructions, when executed by the processor, can cause the processor to perform acoustic echo cancellation on the audio signal using the acoustic echo cancellation parameter. In one example, the instructions cause the processor to transmit the audio signal having the canceled acoustic echo to a far-end system. In another example, the acoustic echo cancellation parameter includes a room impulse response. In still another example, an output of a beamformer that performs beamforming to capture the audio signal, for example, can be an input to an echo canceller that performs the acoustic echo cancellation on the audio signal. Beamforming can be performed with a microphone array using a fixed delay-sum beamformer and a set of beamforming parameters. The instructions can cause the processor to determine the location of the person in the room using camera information, pressure sensor information, signal power information, or a combination thereof. In another example, the instructions can cause the processor to perform the acoustic echo cancellation on a number of channels that are outputted from a beamformer, wherein the number of channels corresponds to a number of persons detected in the room. In further detail, the instructions can cause the processor to determine to update the acoustic echo cancellation parameter when the location of the person in the room changes, as well as determine to not update the acoustic echo cancellation parameter when the location of the person in the room does not change.

Another example of the present disclosure can include a method for acoustic echo cancellation. The method can include determining a location of a person in a room based in part on camera information. The method can include capturing an audio signal received from the location of the person using a beamformer. The method can include determining a room impulse response based in part on the audio signal captured from the location of the person. The method can include providing an output of the beamformer as an input to an echo canceler that performs acoustic echo cancellation on the audio signal received from the location of the person based in part on the room impulse response. The method can include transmitting the audio signal having the canceled acoustic echo. In one example, the acoustic echo cancellation can be on a number of channels that are outputted from the beamformer, wherein the number of channels corresponds to a number of persons detected in the room based in part on the camera information. In another example, performing beamforming can occur using a microphone array using the beamformer and a set of beamforming parameters.

Another example of the present disclosure can include a system for acoustic echo cancellation. The system can include a camera to capture camera information for a room. The system can include a microphone array to capture an audio signal received from a location of a person in the room. The system can include a processor. The processor can determine the location of the person in the room based in part on the camera information. The processor can perform beamforming to capture the audio signal received from the location of the person using the microphone array. The processor can determine an acoustic echo cancellation parameter based in part on the audio signal captured from the location of the person. The processor can perform acoustic echo cancellation on the audio signal using the acoustic echo cancellation parameter. The processor can transmit the audio signal having the canceled acoustic echo. In one example, the processor can perform the acoustic echo cancellation on a number of channels that are outputted from a beamformer that is used to perform the beamforming, wherein the number of channels corresponds to a number of persons detected in the room based in part on the camera information. In another example, the camera can be a stereo camera, a structured light sensor camera, a time-of-flight camera, or a combination thereof. In one specific example, the system can be a video conferencing system.

In these examples, it is noted that when discussing the storage medium, the method, or the system, any of such discussions can be considered applicable to the other examples, whether or not they are explicitly discussed in the context of that example. Thus, for example, in discussing details about an audio signal in the context of the storage medium, such discussion also refers to the methods and systems described herein, and vice versa.

Figure 1:
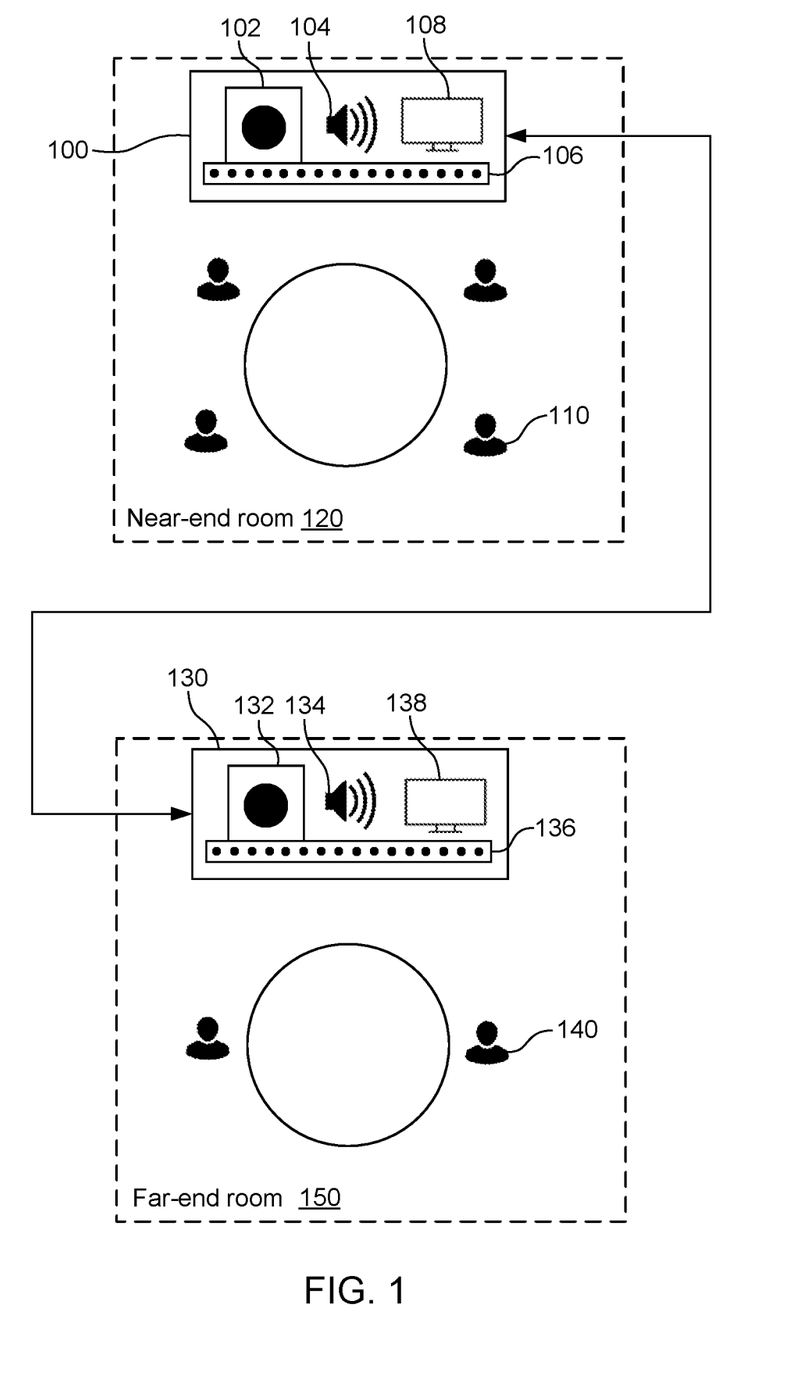
FIG. 1 illustrates an example of a video conference system in a near-end room that includes a plurality of persons in accordance with the present disclosure.

Turning now to the FIGS., FIG. 1 illustrates an example of a video conference system 100 in a near-end room 120 that includes a plurality of persons 110. The video conferencing system 100 can include a camera 102 to capture camera information for the near-end room 120. For example, the camera 102 can capture video of the persons 110 in the near-end room 120. The video captured in the near-end room 120 can be converted to a video signal, and the video signal can be transmitted to a far-end room 150. The video conference system 100 can include a speaker (or loudspeaker) 104. The speaker 104 can receive an audio signal from the far-end room 150 and produce a sound based on the audio signal. The video conference system 100 can include a microphone 106 to capture audio in the near-end room 120. For example, the microphone 106 can capture audio spoken by a person 110 in the near-end room 120. The audio captured in the near-end room 120 can be converted to an audio signal, and the audio signal can be transmitted to the far-end room 150. In addition, the video conference system 100 can include a display 108 to display a video signal received from the far-end room 150.

In one example, the far-end room 150 can include a video conferencing system 130. The video conferencing system 130 can include a camera 132 to capture camera information for the far-end room 150. For example, the camera 132 can capture video of the persons 140 in the far-end room 160. The video captured in the far-end room 150 can be converted to a video signal, and the video signal can be transmitted to the near-end room 120. The video conferencing system 130 can include a speaker 134, which can receive the audio signal from the near-end room 120 and produce a sound based on the audio signal. The video conferencing system 130 can include a microphone 136 to capture audio in the far-end room 150. For example, the microphone 136 can capture audio spoken by a person 140 in the far-end room 150. The audio captured in the far-end room 150 can be converted to an audio signal, and the audio signal can be transmitted to the near-end room 120. In addition, the video conferencing system 130 can include a display 138 to display the video signal received from the near-end room 120.

In the example shown in FIG. 1, the video conference system 100 in the near-end room 120 and the video conference system 130 in the far-end room 150 can enable the persons 110 in the near-end room 120 to communicate with the persons 140 in the far-end room 150. For example, the persons 110 in the near-end room 120 may be able to see and hear the persons 140 in the far-end room 150, based on audio-video information that is communication between the video conference system 100 in the near-end room 120 and the video conference system 130 in the far-end room 150. In this non-limiting example, the near-end room 120 can include four persons and the far-end room 150 can include two persons, but other numbers of persons can be present in the near-end room 120 and the far-end room 150.

In one example, the microphone 106 that captures the audio spoken by the person 110 in the near-end room 120 can be a microphone array. The microphone array can include a plurality of microphones placed at different spatial locations. The microphone array can capture the audio spoken by the person 110 in the near-end room 120 using beamforming. The different spatial locations of the microphones in the microphone array that capture the audio spoken by the person 110 can produce beamforming parameters. A signal strength of signals emanating from particular directions in the near-end room 120, such as a location of the person 110 in the near-end room 120, can be increased based on the beamforming parameters. A signal strength of signals (e.g., due to noise) emanating from other directions in the near-end room 120, such as a location that is different than the location of the person 110 in the near-end room 120, can be combined in a benign or destructive manner based on the beamforming parameters, resulting in degradation of the signals to/from the location that is different than the location of the person 110 in the near-end room 120. As a result, by using sound propagation principles, the microphone array can provide an ability to augment signals emanating from a particular direction in the near-end room 120 based on knowledge of the particular direction.

In one example, beamforming techniques using a microphone array can adaptively track active persons and listen to sound in direction(s) of the active persons, and suppress sound (or noise) coming from other directions. Beamforming using a microphone array can augment a sound quality of received speech by increasing a gain of an audio signal in the active person's direction and reducing a number of far-end speaker echoes received at microphone(s) of the microphone array. In other words, by changing a gain and a phase delay for a given microphone output in the microphone array, a sound signal from a specific direction can be amplified by constructive interference and sound signals in other directions can be attenuated by destructive interference. The gain(s) and phase delay(s) for microphone(s) in the microphone array can be considered to be the beamforming parameters. Further, since the gain and the phase delay for the given microphone output can vary based on the location of the person 110, the beamforming parameters can also depend on the location of the person 110.

Further, beamforming techniques using a microphone array can be classified as data-independent or fixed, or data-dependent or adaptive. For data-independent or fixed beamforming techniques, beamforming parameters can be fixed during operation. For data-dependent or adaptive beamforming techniques, beamforming parameters can be continuously updated based on received signals. Examples of fixed beamforming techniques can include delay-sum beamforming, sub-array delay sum beamforming, super-directivity beamforming or near-field super-directivity beamforming. Examples of adaptive beamforming techniques can include generalized side-lobe canceler beamforming, adaptive microphone-array system for noise reduction (AMNOR) beamforming or post-filtering beamforming.

In one example, the audio captured using the microphone 106 of the video conferencing system 100 in the near-end room 120 can be transmitted as the audio signal to the video conferencing system 130 in the far-end room 150. The audio signal can be used to produce the sound at the speaker 134 of the video conferencing system 130 in the far-end room 150. That sound can bounce around the far-end room 150 for a fraction of a second and can be detected by the microphone 136 of the video conferencing system 100 in the far-end room 150, and then the sound can be sent back to the video conference system 100 in the near-end room 120. In some cases, the sound that bounces around the far-end room 150 can create a distracting and undesired echo that is heard in the near-end room 120. For example, the person 110 in the near-end room 120 can speak and when this sound bounces around the far-end room 150, the person 110 may hear an echo of their own voice.

In one example, acoustic echo cancellation can be used to cancel or reduce acoustic echo in the audio signal being transmitted from the video conferencing system 100 in the near-end room 120 to the video conferencing system 130 in the far-end room 150. The audio signal transmitted from the video conferencing system 100 in the near-end room 120 can include a near-end speech signal and a far-end echoed speech signal. The near-end speech signal can derive from the audio signal that is captured at the near-end room 120 with the microphone array using beamforming, and the far-end echoed speech signal can derive from the audio signal that is received from the far-end room 150. The acoustic echo cancellation can be applied on both the near-end speech signal and the far-end echoed speech signal, such that the far-end echoed speech signal is removed from the audio signal. An audio signal that comprises the near-end speech signal (i.e., an audio signal in which the acoustic echo has been cancelled or reduced) can be transmitted to the video conferencing system 130 in the far-end room 150.

Figure 2:
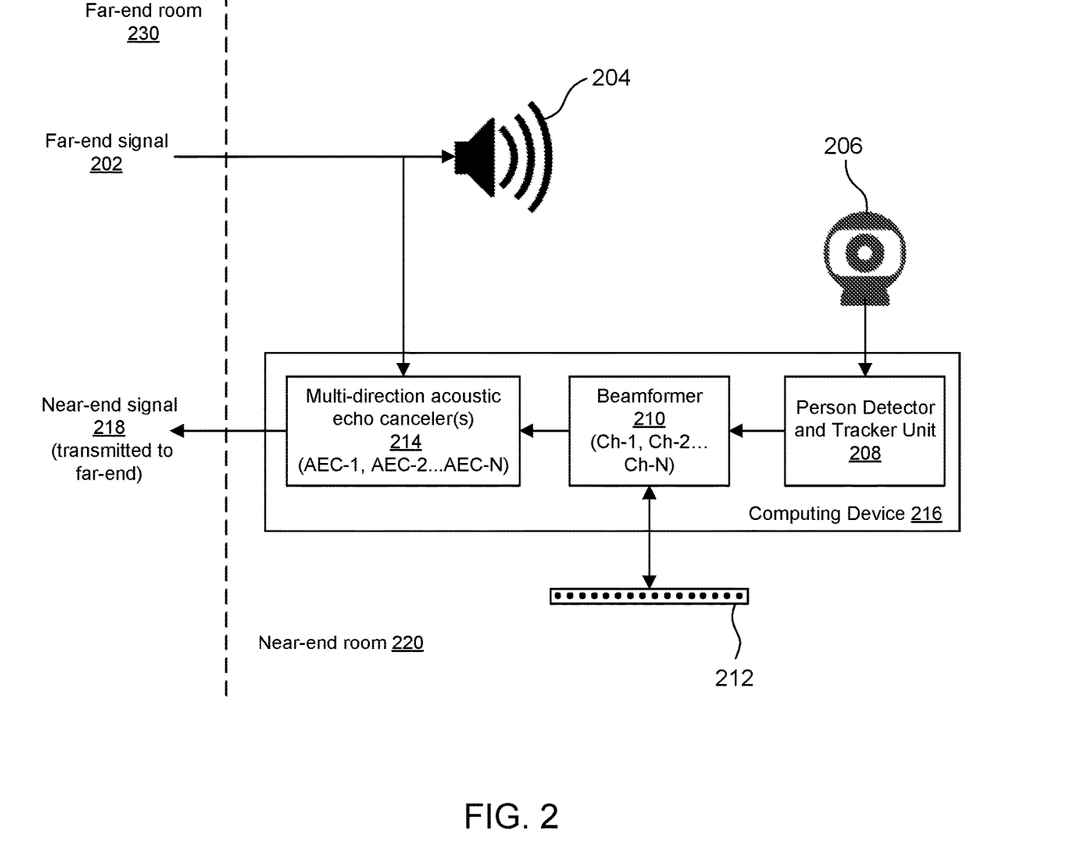
FIG. 2 illustrates an example of a technique for performing acoustic echo cancellation for an audio signal in accordance with the present disclosure.

FIG. 2 illustrates an example of a technique for performing acoustic echo cancellation for an audio signal in accordance with the present disclosure. The acoustic echo cancellation can be performed using a computing device 216 in a near-end room 220. The computing device 216 can be part of a video conferencing system that captures audio-video at the near-end room and transmits the audio-video to a far-end room 230. The computing device 216 may include, or be coupled to, a speaker 204 (or loudspeaker), a camera 206 such as a stereo camera, a structured light sensor camera or a time-of-flight camera, and a microphone array 212. In other words, the speaker 204, the camera 206 and the microphone array 212 can be integrated with the computing device 216, or can be separate units that are coupled to the computing device 216.

In one example, the camera 206 can capture camera information for the near-end room 200. The camera information can be digital images and/or digital video of the near-end room 200. The camera information can be provided to a person detector and tracker unit 208 that operates on the computing device 216. The person detector and tracker unit 208 can analyze the camera information using object detection, which can include facial detection. Based on the camera information, the person detector and tracker unit 208 can determine a number of persons in the near-end room 220, as well as a location of a person in the near-end room 220. The person(s) that are detected in the near-end room 220 based on the camera information can include a person that is currently speaking or a person that is not currently speaking (e.g., a person in the near-end room 220 that is listening to another person who is speaking).

In one example, the location of the person can be a relative location with respect to the number of persons in the near-end room 220. The relative location of the person can imply a relative position of the person or persons with respect to the microphones in the microphone array 212. The relative location can be determined based upon determining a camera position relative to the microphones in the microphone array 212. The camera position relative to the microphones in the microphone array 212 can be determined manually or using object detection. The camera position can be determined once or periodically, as the camera 206 and the microphones in the microphone array 212 can be stationary or semi-stationary.

As a non-limiting example, based on camera information captured using the camera 206, the person detector and tracker unit 208 can detect that there are four persons in the near-end room 220. Further, based on the camera information, the person detector and tracker unit 208 can determine that a first person is at a first location in the near-end room 220, a second person is at a second location in the near-end room 220, a third person is at a third location in the near-end room 220, and a fourth person is at a fourth location in the near-end room 220.

In one example, the person detector and tracker unit 208 can track persons in the near-end room 220 over a period of time. The person detector and tracker unit 208 can run when a level of variation in incoming video frames are above a defined threshold. For example, the person detector and tracker unit 208 can run during a beginning of a videoconference call when persons enter the near-end room 220 and settle down in the near-end room 220, and the person detector and tracker unit 208 can run at a reduced mode when persons are less likely to move in the near-end room 220 and therefore maintain a direction with respect to the microphone array 212.

In one example, the person detector and tracker unit 208 can provide person location information to a beamformer 210 that operates on the computing device 216. The person location information can indicate the location of the person in the near-end room 220. The beamformer 210 can be a fixed beamformer (e.g., a beamformer that performs delay-sum beamforming) or an adaptive beamformer. The beamformer 210 can be coupled to the microphone array 212. The beamformer 210 and the microphone array 212 can work together to perform beamforming. The beamformer 210 and the microphone array 212 can capture an audio signal received from the location of the person in the near-end room 220. For example, when the person in the near-end room 220 speaks, and the location of that person is established based on the person location information, the beamformer 210 and the microphone array 212 can capture the audio signal received from the location of the person in the near-end room 220. The audio signal can be captured using beamforming parameters, where the beamforming parameters can be set based on the location of the person in the near-end room.

In one example, the beamformer 210 can provide the audio signal received from the location of the person in the near-end room 220 using the beamforming parameters to a multi-direction acoustic echo canceler 214. In other words, an output of the beamformer 210 can be an input to the acoustic echo canceler 214. The acoustic echo canceler 214 can operate on the computing device 216. The acoustic echo canceler 214 can also receive a far-end signal 202 from the far-end room 230. The far-end signal 202 can be provided to the speaker 204 in the near-end room 220 and cause an acoustic echo in the near-end room 220, which can be detected by the microphone array 212. The acoustic echo canceler 214 can determine an acoustic echo cancellation parameter based on the beamforming parameters associated with the audio signal received from the location of the person in the near-end room 220 using the beamformer 210. One example of the acoustic echo cancellation parameter can be a room impulse response. The room impulse response can correspond to the beamforming parameters associated with the audio signal received from the location of the person in the near-end room 220 using the beamformer 210, as well as the acoustic echo caused by the far-end signal 202.

In one example, the acoustic echo canceler 214 can model the room impulse response using a finite impulse response (FIR) filter. More specifically, the acoustic echo canceler 214 can model the room impulse response using the FIR filter based on a speaker signal from the speaker 104 and a microphone signal from the microphone 106. Depending on the speaker signal and the microphone signal, the room impulse response can be estimated using the FIR. Thus, FIR parameters can correspond with the acoustic echo cancellation parameters.

In one example, the acoustic echo cancellation parameter can be applied to the audio signal received from the location of the person in the near-end room 220, thereby producing an audio signal with a cancelled (or reduced) acoustic echo. In other words, the acoustic echo cancellation parameter can be applied to cancel or reduce the acoustic echo caused by the far-end signal 202 that is detected at the microphone array 212, which can produce a resulting audio signal that is not affected by the acoustic echo caused by the far-end signal 202. The resulting audio signal can be a near-end signal 218 that is transmitted to the far-end room 230. Since the acoustic echo cancellation has been applied to the near-end signal 218 to remove or reduce the acoustic echo, the near-end signal 218 can be of increased sound quality.

In one example, the beamformer 210 can operate with N beams or N channels, wherein N is a positive integer. One channel or one beam can correspond with a person detected using the person detector and tracker unit 208. Similarly, the acoustic echo cancellation can be performed with respect to the N beams or the N channels.

As a non-limiting example, the person detector and tracker unit 208 can detect three persons in the near-end room 220. In this example, the beamformer 210 can receive an audio signal from a first person in the near-end room 220 using a first beam or channel, an audio signal from a second person in the near-end room 220 using a second beam or channel, and an audio signal from a third person in the near-end room 220 using a third beam or channel. Then, a first acoustic echo canceler can perform acoustic echo cancellation on the first beam or channel, a second acoustic echo canceler can perform acoustic echo cancellation on the second beam or channel, and a third acoustic echo canceler can perform acoustic echo cancellation on the third beam or channel. Thus, a person identified in the far-end room can correspond with a beam or channel, and acoustic echo cancellation can be applied to that beam or channel. This technique can have increased computationally efficiency since it depends on a number of persons in the near-end room 220, as opposed to a number of channels in the microphone array 212.

A number of acoustic echo cancellers could correspond to a number of channels of a microphone array, even when a number of persons in the room were less than the number of channels in the microphone array. In other words, channel wise echo cancellation could be performed, where one microphone signal would correspond to one channel. This solution would become more computationally intensive when the number of microphones in the microphone array would increase. For example, a 16-microphone array with four persons in the room would result in 16 acoustic echo cancellers being used to perform acoustic echo cancellation. As a result, an increased number of computations would be performed when a number of persons in the room were less than the number of microphones in the microphone array.

In addition, beamforming would be performed after the acoustic echo cancellation to capture audio from a defined location in the room. For example, 16 acoustic echo cancellers would be used to perform acoustic echo cancellation for a 16-microphone array with four persons in the room, and then beamforming would be performed for the four persons in the room.

In the present disclosure, the camera information can be used to determine a number of persons in a room, and a number of beams or channels used by a beamformer can correspond to the number of persons in the room. Further, the number of echo cancelers used to perform acoustic echo cancellation can correspond to the number of beams or channels used by the beamformer. Thus, in the present disclosure, the acoustic echo cancellation can be performed after the beamforming.

In the present disclosure, an increased number of microphones can be used in the microphone array while maintaining increased computational efficiency, even when a reduced number of persons are in the room. An increased number of microphones in the microphone array can provide increased directivity and increased gain or signal-to-noise ratio (SNR) in a direction of interest. Thus, the present disclosure provides an acoustic echo cancellation setup with reduced complexity while maintaining an increased number of microphones in a microphone array.

As a non-limiting example, a 16-microphone array with four persons can result in four beams or channels, and can result in four acoustic echo cancellers being used to perform acoustic echo cancellation. Thus, in the present disclosure, a computational efficiency can be increased because the acoustic echo cancellation can be performed based on the number of persons in the room (and the corresponding number of beams or channels), and not based on a number of channels in the microphone array.

Figure 3:
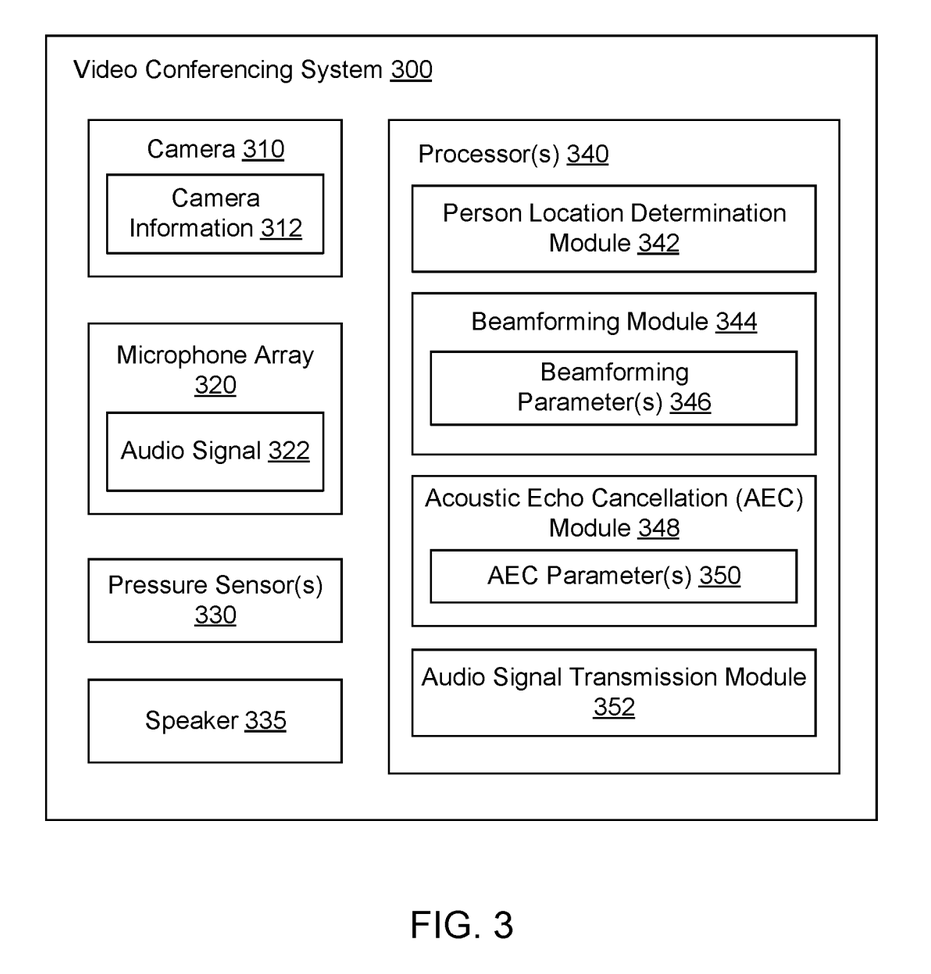
FIG. 3 illustrates an example of a video conferencing system for performing acoustic echo cancellation in accordance with the present disclosure.

FIG. 3 illustrates an example of a video conferencing system 300 for performing acoustic echo cancellation. The video conferencing system 300 can be a near-end video conferencing system or a far-end video conferencing system. The video conferencing system 300 can include a camera 310 such as a stereo camera, a structured light sensor camera or a time-of-flight camera, a microphone array 320, pressure sensor(s) 330, a speaker 335 (or loudspeaker), and a processor 340 that performs the acoustic echo cancellation on an audio signal 322. One non-limiting example of the processor 340 can be a digital signal processor (DSP).

In one example, the camera 310 can capture camera information 312 for a room. The camera information 312 can include video information of the room, which can include a plurality of video frames. The camera 310 can operate continuously or intermittently to capture the camera information 312 for the room. For example, the camera 310 can operate continuously during the videoconference session, or can operate intermittently during the videoconferencing session (e.g., at a beginning of the videoconferencing session and at defined periods during the videoconferencing session).

In one example, the microphone array 320 can capture the audio signal 322 received from a location of a person in the room. The microphone array 320 can include a plurality of microphones at different spatial locations. The microphones in the microphone array 320 can be omnidirectional microphones, directional microphones, or a combination of omnidirectional and directional microphones.

In one example, the speaker 335 can produce a sound, which can be detected by the microphone array 320. For example, the sound can correspond to an audio signal received at the video conferencing system 300 from a far-end.

In one example, the processor 340 can include a person location determination module 342. The person location determination module 342 can determine the location of the person in the room based on the camera information 312. For example, the person location determination module 342 can analyze the camera information 312 using object detection, facial recognition, or like techniques to determine a number of persons in the room and a location of a person in the number of persons in the room. The location of the person can be a relative location with respect to locations of other persons in the room.

Additionally, the person location determination module 342 can determine the location of the person in the room using pressure sensor information from the pressure sensor(s) 330. The pressure sensor(s) 330 can be installed on chairs or seats in the room, and can be used to detect the presence of persons in the room. For example, a pressure sensor 330 installed on a certain chair can detect whether a person is sitting on that chair based on pressure sensor information produced by the pressure sensor 330. The pressure sensor(s) 330 can send the pressure sensor information, which can enable the person location determination module 342 to determine the number of persons in the room.

Additionally, the person location determination module 342 can determine the location of the person in the room using signal power information, as determined at the microphone array 320. The signal power information can indicate a signal power associated with the audio signal 322 detected using the microphone array 320. The signal power associated with the audio signal 322 can be used to determine a distance and/or location of the person in the room in relation to the microphone array 320. The signal power information can be provided to enable the person location determination module 342 to determine the location of the person in the room.

In one example, the processor can include a beamforming module 344. The beamforming module 344 can perform beamforming to capture the audio signal 322 received from the location of the person using the microphone array 320. In one example, the beamforming module 344 can use a fixed beamforming technique, such as delay-sum beamforming, sub-array delay sum beamforming, super-directivity beamforming or near-field super-directivity beamforming. In another example, the beamforming module 344 can use an adaptive beamforming technique, such as generalized side-lobe canceler beamforming, AMNOR beamforming or post-filtering beamforming.

In one example, the beamforming module 344 can capture the audio signal 322 received from the location of the person using beamforming parameters 346, where the beamforming parameters 346 can be based on the location of the person in the room. In other words, the location of the person in the room can be determined using the camera information 312, and that location can be used to set or adjust the beamforming parameters 346. Based on the beamforming parameters 346, the audio signal can be captured from the location of the person.

In one example, the processor 340 can include an acoustic echo cancellation module 348. The acoustic echo cancellation module 348 can determine an acoustic echo cancellation parameter 350 based on the audio signal 322 captured from the location of the person. More specifically, the acoustic echo cancellation module 348 can determine the acoustic echo cancellation parameter 350 based on the beamforming parameters 346, which can be set based on the detected location of the person in the room. Thus, the acoustic echo cancellation module 348 can receive the audio signal 322 from the beamforming module 344. In this case, an output of the beamforming module 344 can be an input to the acoustic echo cancellation module 348.

In one example, the acoustic echo cancellation parameter 350 can be a room impulse response. The room impulse response can correspond to the beamforming parameters 346 associated with the audio signal 322 received from the location of the person in the room, as well as an acoustic echo detected by the microphone array 320. The acoustic echo can result from sound produced by the speaker 335, as detected by the microphone array 320. The sound can be associated with the audio signal received at the video conferencing system 300 from the far-end. The room impulse response can be specific to one microphone in the microphone array 320. In other words, one microphone in the microphone array 320 can be associated with one room impulse response, while another microphone in the microphone array 320 can be associated with another room impulse response.

In one example, the room impulse response can be modelled using a FIR filter. More specifically, the room impulse response can be modelled using the FIR filter based on a speaker signal from the speaker 335 and the audio signal 322 detected at the microphone 320. Depending on the speaker signal and the audio signal 322, the room impulse response can be estimated using the FIR. Thus, FIR parameters can correspond with the acoustic echo cancellation parameter 350.

In one example, the acoustic echo cancellation module 348 can perform acoustic echo cancellation on the audio signal 322 using the acoustic echo cancellation parameter 350, such as the room impulse response. The acoustic echo cancellation module 348 can apply the acoustic echo cancellation parameter to cancel or reduce an acoustic echo in the audio signal 322.

In one example, the acoustic echo cancellation module 348 can converge to an acoustic echo cancellation solution in a reduced amount of time when the room impulse response is relatively sparse, as compared to when the room impulse response is relatively dense. In one example, echoes can be formed when sound from the speaker 335 is produced, reflects through the room and then reaches the microphone array 320. The microphone array 320 may be able to receive sound from multiple directions. By using the beamforming, sound from a particular direction in the room can be captured. A number of reflected sounds coming from this particular direction can be reduced, in which case the room impulse response can be relatively sparse. The acoustic echo cancellation module 348 can learn reduced reflections due to the sparse room impulse response, so the acoustic echo cancellation module 348 can converge to the acoustic echo cancellation solution in the reduced amount of time.

In one example, the processor 340 can include an audio signal transmission module 352. The audio signal transmission module 352 can receive the audio signal 322 having the cancelled acoustic echo from the acoustic echo cancellation module 348. The audio signal transmission module 352 can transmit the audio signal having the cancelled acoustic echo to, for example, a remote video conferencing system.

In one configuration, the beamforming module 344 can operate with N beams or N channels, wherein N is a positive integer. One channel or one beam can correspond with a person detected in the room. Similarly, the acoustic echo cancellation module 348 can perform acoustic echo cancellation with the N beams or the N channels that are outputted from the beamforming module 344. In this example, the N beams or the N channels can correspond to a number of persons detected in the room. Thus, the acoustic echo cancellation module 348 can operate parallel acoustic echo canceler(s) that are equal to number of persons detected in the room, which can result in increased computational efficiency.

In one configuration, the acoustic echo cancellation module 348 can determine the acoustic echo cancellation parameter 350 based on the beamforming parameters 346, which can be set based on the detected location of the person in the room. In one example, the acoustic echo cancellation module 348 can update the acoustic echo cancellation parameter 350 when the location of the person in the room changes. In other words, the changed location of the person in the room can change the beamforming parameters 346, which in turn can cause the acoustic echo cancellation parameter 350 to be updated. On the other hand, the acoustic echo cancellation module 348 can determine to not update the acoustic echo cancellation parameter 350 when the location of the person in the room does not change. By updating the acoustic echo cancellation parameter 350 when the location of the person in the room changes and not updating the acoustic echo cancellation parameter 350 when the location of the person in the room does not change, compute resources can be saved at the processor 340.

In one configuration, spatial audio techniques can be used to create a directional sound at a far-end video conferencing system by collecting information from a near-end. A far-end device can be a sound bar or a headset, for which directional sounds can be created. For sound bars, beamforming can be used to create the directional sounds. For headsets, head related transfer functions (HTRF) can be used to create the directional sounds. A person direction at the near-end can be estimated by using the camera information 312, and an average position of the person can be selected to accommodate for minor movements of the person at the near-end. Information about the person direction and the average position of the person can be sent from the video conferencing system 300 at the near-end to the far-end video conferencing system to enable the directional sound to be created. By selecting the average position of the person, a loudspeaker beamformer or HTRF spatial audio renderer at the far-end video conferencing system may not continuously change parameters, thereby saving computations at the far-end video conferencing system.

Figure 4:
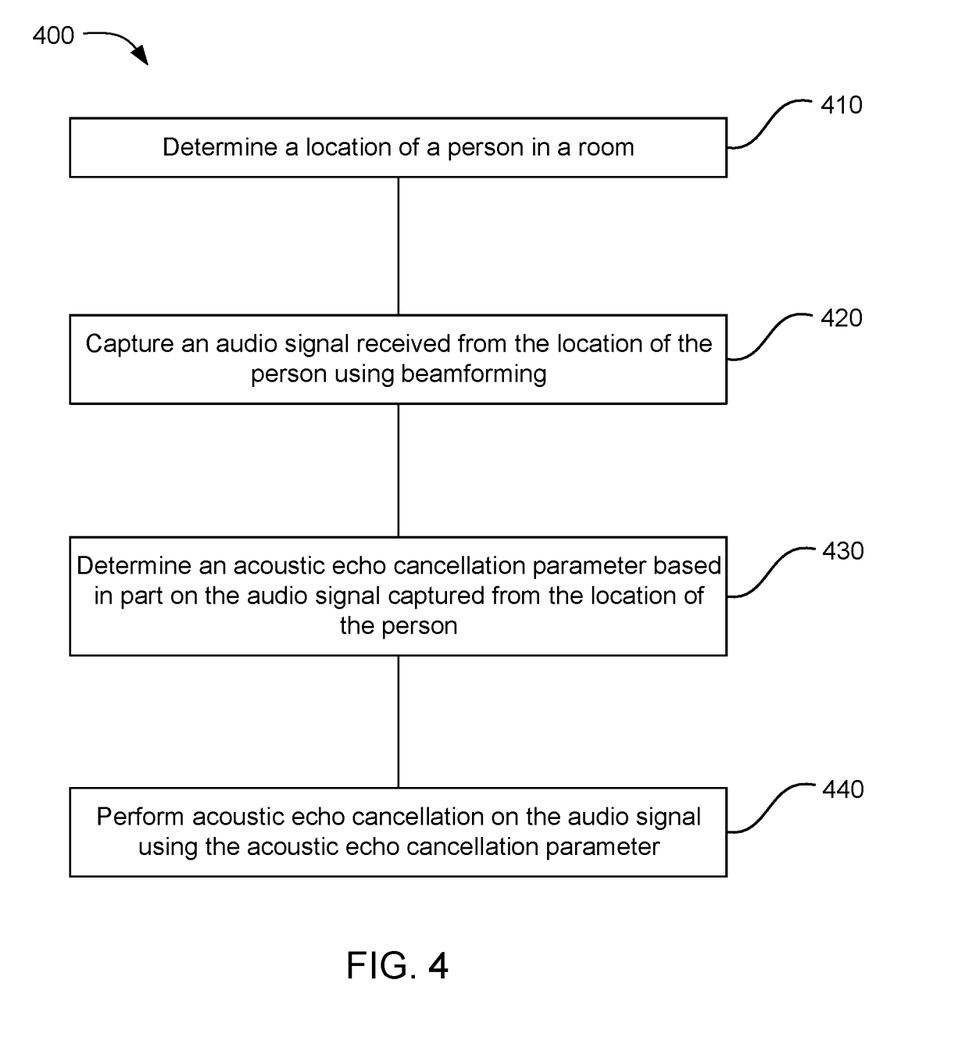
FIG. 4 is a flowchart illustrating an example method of performing acoustic echo cancellation in a video conference system in accordance with the present disclosure.

FIG. 4 is a flowchart illustrating one example method 400 of performing acoustic echo cancellation in a video conference system. The method can be executed as instructions on a machine, where the instructions can be included on a non-transitory machine readable storage medium. The method can include determining a location of a person in a room, as in block 410. The method can include capturing an audio signal received from the location of the person using beamforming, as in block 420. The method can include determining an acoustic echo cancellation parameter based in part on the audio signal captured from the location of the person, as in block 430. The method can include performing acoustic echo cancellation on the audio signal using the acoustic echo cancellation parameter, as in block 440. In one example, the method 400 can be performed using the video conferencing system 300, but the method 400 is not limited to being performed using the video conferencing system 300.

Figure 5:
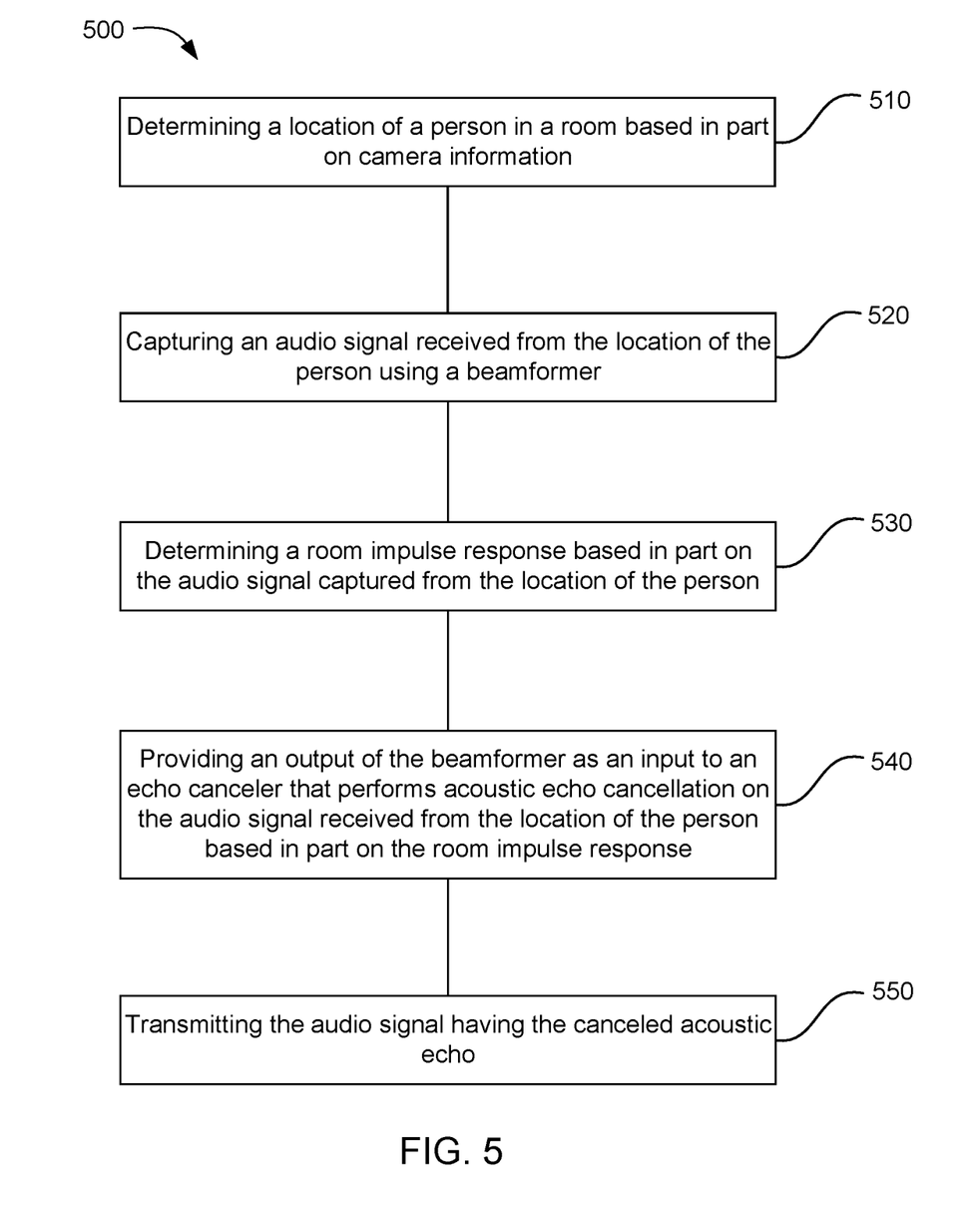
FIG. 5 is a flowchart illustrating another example method of performing acoustic echo cancellation in a video conference system in accordance with the present disclosure.

FIG. 5 is a flowchart illustrating one example method 500 of performing acoustic echo cancellation in a video conference system. The method can be executed as instructions on a machine, where the instructions can be included on a non-transitory machine readable storage medium. The method can include determining a location of a person in a room based in part on camera information, as in block 510. The method can include capturing an audio signal received from the location of the person using a beamformer, as in block 520. The method can include determining a room impulse response based in part on the audio signal captured from the location of the person, as in block 530. The method can include providing an output of the beamformer as an input to an echo canceler that performs acoustic echo cancellation on the audio signal received from the location of the person based in part on the room impulse response, as in block 540. The method can include transmitting the audio signal having the canceled acoustic echo, as in block 550. In one example, the method 500 can be performed using the video conferencing system 300, but the method 500 is not limited to being performed using the video conferencing system 300.

Figure 6:
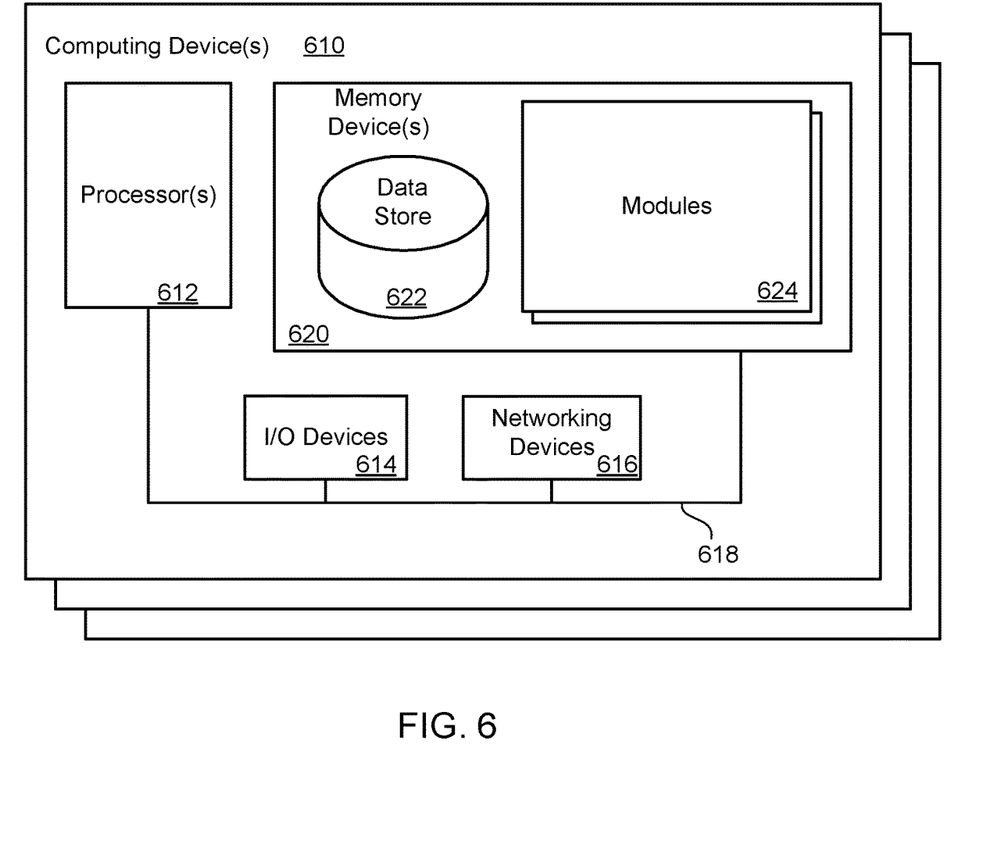
FIG. 6 is a block diagram that provides an example illustration of a computing device that can be employed in the present disclosure.

FIG. 6 illustrates a computing device 610 on which modules of this disclosure can execute. A computing device 610 is illustrated on which a high level example of the disclosure can be executed. The computing device 610 can include processor(s) 612 that are in communication with memory devices 620. The computing device can include a local communication interface 618 for the components in the computing device. For example, the local communication interface can be a local data bus and/or a related address or control busses as can be desired.

The memory device 620 can contain modules 624 that are executable by the processor(s) 612 and data for the modules 624. The modules 624 can execute the functions described earlier, such as: determining a location of a person in a room based in part on camera information; capturing an audio signal received from the location of the person using a beamformer; determining a room impulse response based in part on the audio signal captured from the location of the person; providing an output of the beamformer as an input to an echo canceler that performs acoustic echo cancellation on the audio signal received from the location of the person based in part on the room impulse response; and transmitting the audio signal having the canceled acoustic echo.

A data store 622 can also be located in the memory device 620 for storing data related to the modules 624 and other applications along with an operating system that is executable by the processor(s) 612.

Other applications can also be stored in the memory device 620 and can be executable by the processor(s) 612. Components or modules discussed in this description that can be implemented in the form of machine-readable software using high programming level languages that are compiled, interpreted or executed using a hybrid of the methods.

The computing device can also have access to I/O (input/output) devices 614 that are usable by the computing devices. An example of an I/O device is a display screen that is available to display output from the computing devices. Networking devices 616 and similar communication devices can be included in the computing device. The networking devices 616 can be wired or wireless networking devices that connect to the internet, a local area network (LAN), wide area network (WAN), or other computing network.

The components or modules that are shown as being stored in the memory device 620 can be executed by the processor 612. The term "executable" can mean a program file that is in a form that can be executed by a processor 612. For example, a program in a higher level language can be compiled into machine code in a format that can be loaded into a random access portion of the memory device 620 and executed by the processor 612, or source code can be loaded by another executable program and interpreted to generate instructions in a random access portion of the memory to be executed by a processor. The executable program can be stored in a portion or component of the memory device 620. For example, the memory device 620 can be random access memory (RAM), read-only memory (ROM), flash memory, a solid state drive, memory card, a hard drive, optical disk, floppy disk, magnetic tape, or other memory components.

The processor 612 can represent multiple processors and the memory 620 can represent multiple memory units that operate in parallel to the processing circuits. This can provide parallel processing channels for the processes and data in the system. The local interface 618 can be used as a network to facilitate communication between the multiple processors and multiple memories. The local interface 618 can use additional systems designed for coordinating communication such as load balancing, bulk data transfer, and similar systems.

While the flowcharts presented for this disclosure can imply a specific order of execution, the order of execution can differ from what is illustrated. For example, the order of two more blocks can be rearranged relative to the order shown. Further, two or more blocks shown in succession can be executed in parallel or with partial parallelization. In some configurations, block(s) shown in the flow chart can be omitted or skipped. A number of counters, state variables, warning semaphores, or messages can be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module can be implemented as a hardware circuit comprising custom very-large-scale integration (VLSI) circuits or gate arrays, off-the-shelf semiconductors such as logic chips, transistors, or other discrete components. A module can also be implemented in programmable hardware devices such as field programmable gate arrays, programmable array logic, programmable logic devices or the like.

Modules can also be implemented in machine-readable software for execution by various types of processors. An identified module of executable code can, for instance, comprise block(s) of computer instructions, which can be organized as an object, procedure, or function. Nevertheless, the executables of an identified module need not be physically located together, but can comprise disparate instructions stored in different locations which comprise the module and achieve the stated purpose for the module when joined logically together.

Indeed, a module of executable code can be a single instruction, or many instructions, and can even be distributed over several different code segments, among different programs, and across several memory devices. Similarly, operational data can be identified and illustrated herein within modules, and can be embodied in a suitable form and organized within a suitable type of data structure. The operational data can be collected as a single data set, or can be distributed over different locations including over different storage devices. The modules can be passive or active, including agents operable to perform desired functions.

The disclosure described here can also be stored on a computer readable storage medium that includes volatile and non-volatile, removable and non-removable media implemented with a disclosure for the storage of information such as computer readable instructions, data structures, program modules, or other data. Computer readable storage media can include, but is not limited to, RAM, ROM, electrically erasable programmable read-only memory (EEPROM), flash memory or other memory disclosure, compact disc read-only memory (CD-ROM), digital versatile disks (DVD) or other optical storage, magnetic cassettes, magnetic tapes, magnetic disk storage or other magnetic storage devices, or other computer storage medium which can be used to store the desired information and described disclosure.

The devices described herein can also contain communication connections or networking apparatus and networking connections that allow the devices to communicate with other devices. Communication connections can be an example of communication media. Communication media can embody computer readable instructions, data structures, program modules and other data in a modulated data signal such as a carrier wave or other transport mechanism and can include information delivery media. By way of example, and not limitation, communication media can include wired media such as a wired network or direct-wired connection, and wireless media such as acoustic, radio frequency, infrared, and other wireless media. The term computer readable media as used herein can include communication media.

Reference was made to the examples illustrated in the drawings, and specific language was used herein to describe the same. It will nevertheless be understood that no limitation of the scope of the disclosure is thereby intended. Alterations and further modifications of the features illustrated herein, and additional applications of the examples as illustrated herein, are to be considered within the scope of the description.

Furthermore, the described features, structures, or characteristics can be combined in a suitable manner. In the preceding description, numerous specific details were provided, such as examples of various configurations to provide a thorough understanding of examples of the described disclosure. The disclosure may be practiced without some of the specific details, or with other methods, components, devices, etc. In other instances, some structures or operations are not shown or described in detail to avoid obscuring aspects of the disclosure.

Although the subject matter has been described in language specific to structural features and/or operations, it is to be understood that the subject matter defined in the appended claims is not limited to the specific features and operations described above. Rather, the specific features and acts described above are disclosed as example forms of implementing the claims. Numerous modifications and alternative arrangements can be devised without departing from the scope of the described disclosure.

What is claimed is:

1. A non-transitory machine readable storage medium comprising instructions that, when executed by a processor, cause the processor to:
   determine a location of a person in a room;
   capture an audio signal received from the location of the person using beamforming;
   determine an acoustic echo cancellation parameter based in part on the audio signal captured from the location of the person; and
   perform acoustic echo cancellation on the audio signal using the acoustic echo cancellation parameter, including to perform the acoustic echo cancellation on a number of channels that are outputted from a beamformer, wherein the number of channels corresponds to a number of persons detected in the room,
   wherein the acoustic echo cancellation parameter includes a room impulse response.

2. The non-transitory machine readable storage medium of claim 1, wherein the instructions cause the processor to: transmit the audio signal having the canceled acoustic echo to a far-end system.

3. The non-transitory machine readable storage medium of claim 1, wherein an output of the beamformer that performs beamforming to capture the audio signal is an input to an echo canceller that performs the acoustic echo cancellation on the audio signal.

4. The non-transitory machine readable storage medium of claim 1, wherein the beamforming is performed with a microphone array using a fixed delay-sum beamformer and a set of beamforming parameters.

5. The non-transitory machine readable storage medium of claim 1, wherein the instructions cause the processor to determine the location of the person in the room using camera information, pressure sensor information, signal power information, or a combination thereof.

6. The non-transitory machine readable storage medium of claim 1, wherein the instructions cause the processor to:
determine to update the acoustic echo cancellation parameter when the location of the person in the room changes; and
determine to not update the acoustic echo cancellation parameter when the location of the person in the room does not change.

7. A method for acoustic echo cancellation, comprising:
determining a location of a person in a room based in part on camera information;
capturing an audio signal received from the location of the person using a beamformer;
determining a room impulse response based in part on the audio signal captured from the location of the person;
providing an output of the beamformer as an input to an echo canceler that performs acoustic echo cancellation on the audio signal received from the location of the person based in part on the room impulse response, wherein the room impulse response is an acoustic echo cancellation parameter;
performing the acoustic echo cancellation on a number of channels that are outputted from the beamformer, wherein the number of channels corresponds to a number of persons detected in the room based in part on the camera information; and
transmitting the audio signal having the canceled acoustic echo.

8. The method of claim 7, comprising performing beamforming with a microphone array using the beamformer and a set of beamforming parameters.

9. A system for acoustic echo cancellation, comprising:
a camera to capture camera information for a room;
a microphone array to capture an audio signal received from a location of a person in the room; and
a processor to:
determine the location of the person in the room based in part on the camera information;
perform beamforming to capture the audio signal received from the location of the person using the microphone array;
determine an acoustic echo cancellation parameter based in part on the audio signal captured from the location of the person;
perform acoustic echo cancellation on the audio signal using the acoustic echo cancellation parameter, wherein the acoustic echo cancellation parameter includes a room impulse response, including to perform the acoustic echo cancellation on a number of channels that are outputted from a beamformer that is used to perform the beamforming, wherein the number of channels corresponds to a number of persons detected in the room based in part on the camera information; and
transmit the audio signal having the canceled acoustic echo.

10. The system of claim 9, wherein the camera is a stereo camera, a structured light sensor camera, a time-of-flight camera, or a combination thereof.

11. The system of claim 9, wherein the system is a video conferencing system.

* * * * *